United States Patent [19]

Pottinger et al.

[11] Patent Number: 4,918,708
[45] Date of Patent: Apr. 17, 1990

[54] ANALYSIS OF DIGITAL RADIO TRANSMISSIONS

[75] Inventors: John R. Pottinger, Dunfermline; Murdo J. McKissock, South Queensferry, both of Scotland

[73] Assignee: Hewlett-Packard Company, Palo Alto, Calif.

[21] Appl. No.: 27,296

[22] Filed: Mar. 17, 1987

[30] Foreign Application Priority Data

Mar. 17, 1986 [GB] United Kingdom ................. 8606572

[51] Int. Cl.$^4$ ........................................... H04B 17/00
[52] U.S. Cl. .................................... 375/10; 364/514; 364/521; 364/481
[58] Field of Search ..................... 375/10, 39, 102, 83, 375/99; 371/22, 24, 25; 364/480, 481, 514, 521

[56] References Cited

U.S. PATENT DOCUMENTS

| 4,381,546 | 4/1983 | Armstrong | 375/10 |
| 4,606,051 | 8/1986 | Crabtree et al. | 375/102 |
| 4,627,071 | 12/1986 | Head et al. | 375/10 |
| 4,639,934 | 1/1987 | Zuranski et al. | 375/10 |

OTHER PUBLICATIONS

IBM Technical Disclosure Bulletin, vol. 18, No. 8, Jan. 1978, pp. 2726-2627, New York, U.S.; P. G. Bryant et al.: "Line quality monitoring method" *The whole document*.
ICC'80 Conference Record of the International Conference on Communications, 8th-12th Jun. 1980, Seattle, WA, vol. 2, pp. 33.6.1-33.6.6, IEEE, New York, U.S.; G. L. Heiter et al.: "Measurement and analysis of non-linearities in digital transmission" p. 33.6.1, left-hand column, lines 1-3, p. 33.6.3, left-hand column, lines 41-44.
Patents Abstracts of Japan, vol. 6, No. 254 (E-148) [1132], 14th Dec. 1982, & JP-A-57 152 755 (Hitachi Denshi R. K.) 21-09-1982 *Abstract*.

Primary Examiner—Robert L. Griffin
Assistant Examiner—Marianne Huseman
Attorney, Agent, or Firm—Jeffery B. Fromm

[57] ABSTRACT

Provided is an apparatus for analysing digital radio transmissions which can provide an output indicating the condition of a digital transmission link. The apparatus operates by sampling received radio signals to produce for each sampling instant a signal or signals representative of the modulation state of the transmission at the sampling instant. The apparatus includes a processor which can receive and measure a given number of such signals. The processing means is arranged to process the signals according to one or more stored routines and generate one or more parameters which indicate the condition of the transmission. The apparatus includes means for representing the samples by digitally encoded numbers and the processing means arranges those samples into one of a plurality of groups according to the value of the number. The number of groups correspond to the number of modulation states. This technique allows the apparatus to carry out accurate analysis of the transmission.

4 Claims, 10 Drawing Sheets

ANALYSIS OF DIGITAL RADIO TRANSMISSIONS

This invention relates to the analysis and testing of digital radio transmissions. In particular it relates to apparatus which can be used to carry out such analysis.

In a digital radio transmission system digitally encoded data is transmitted from a transmitter in the form of modulated carrier waves. Various modulation schemes are known and these allow data to be transmitted at varying rates. For example in 16 QAM two quadrature carrier waves are transmitted and each carrier wave can be modulated with one of four levels. This arrangement provides 16 modulation states and enables each group of four bits in the digital data to be represented by a particular one of the 16 states.

At the receiving equipment the transmitted signals are demodulated and applied to decision circuitry which recognises the particular modulation states and outputs the appropriate digits so that the digital data is re-constituted.

It is important that such radio links can be analysed and tested since if the transmission degrades errors can occur. One way of observing errors is to use the two demodulated signals to form what are known as eye diagrams, for example on a cathode ray tube display.

Another way in which the transmission can be observed is to sample the received demodulated signals at instants corresponding to decision instants and to represent the results on a display in an X-Y co-ordinate format. In the case of 16 QAM this produces a 4 by 4 array of clusters of points, each cluster corresponding to a particular modulation state. Ideally there should be 16 dots on the display but in practice these appear as small clusters or groupings of dots. In a system which is functioning correctly the display will comprise tightly grouped clusters of dots in a perfectly square configuration sometimes known as a constellation. Any distortion from this arrangement are due to faults and the particular form of the distortion can be used to identify the type of fault.

The present invention is concerned with apparatus which can produce both eye and constellation displays and which has a graticule selection facility together with a simple means for adjusting the constellation to the graticule. The apparatus can also provide quantitative analysis of the constellation which has not hitherto been possible.

According to the present invention there is provided apparatus for analysing digital radio transmissions comprising means for sampling received radio signals to produce for each sampling instant a signal or signals representative of the modulation state of the transmission at the sampling instant, and processing means which can receive and measure a given number of said signals, said processing means being operable to process said signals in accordance with one or more stored routines to generate one or more parameters which are indicative of the condition of the transmission, characterised in that said samples are represented by digitally encoded numbers and said processing means is arranged to allocate said numbers to one of a plurality of groups, the number of groups corresponding to the number of modulation states of the transmission.

Cross-reference to U.S. Pat. No. 4,825,449 should be noted.

The invention will be described now by way of example only with particular reference to the accompanying drawings. In the drawings.

Figure 1:
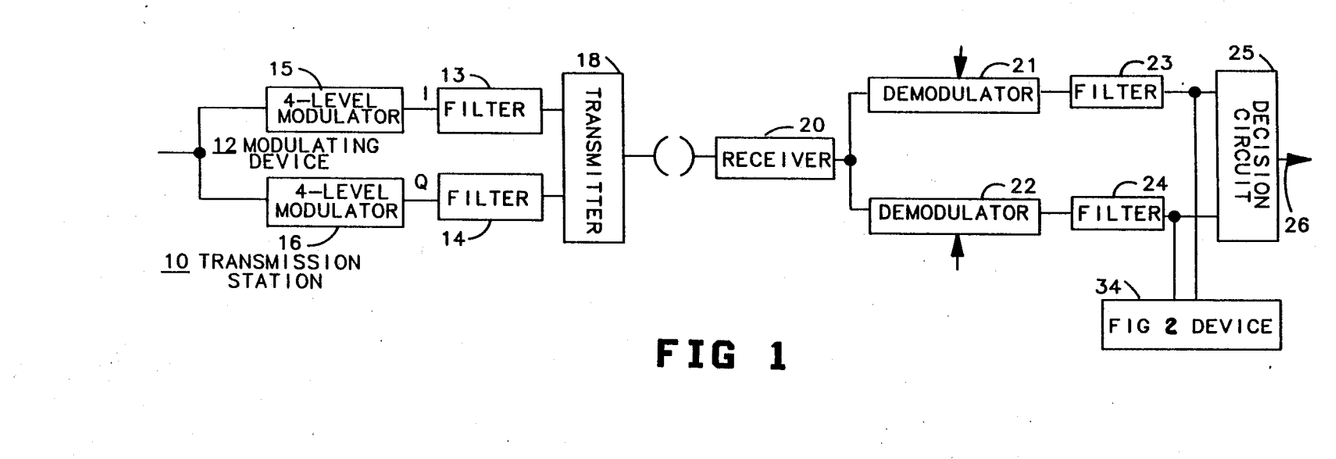
FIG. 1 is a schematic illustration of a digital radio transmission system.

The present description is concerned with apparatus for testing or analysing digital radio transmissions. A schematic illustration of a digital radio link is given in FIG. 1. At a transmission station 10 data, which may be PCM data, on line 11 is applied to a modulating device 12. The modulating device 12 shown in FIG. 1 is designed to provide 16 QAM modulation and has two paths I and Q, one of which uses a sine wave and the other a cosine wave. Each path includes a four level modulator 15, 16 and this arrangement provides 16 possible modulation combinations for representing the digitally encoded data. The modulated signals are filtered in filters 13, 14 and transmitted from a transmitter 18 which may include a travelling wave tube.

Figure 2:
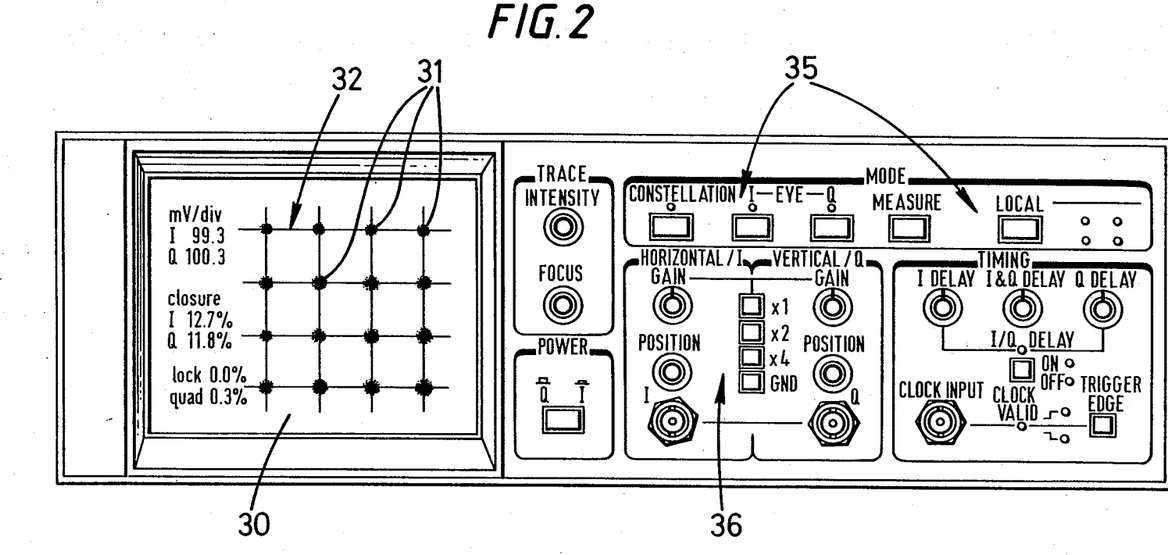
FIG. 2 is a view showing the front panel of a device in accordance with the present invention.

At a receiver 20 the transmitted signals are detected and filtered and then demodulated at demodulators 21, 22 by signals corresponding to the sine and cosine carriers. These signals are then filtered in filters 23, 24 and applied to a decision circuit 25 to reconstitute the digital data which is then output on line 26. There are known ways of analysing digital radio transmissions. One of these is to observe the eye diagram. Another is to construct a constellation which is an array of clusters of points on for example a cathode ray tube screen each of which corresponds to one of the modulations of the transmitted radio signals. In the case of 16 QAM an array of the type shown on the display 30 (FIG. 2) of the present device is obtained. The display is formed by sampling the recovered I and Q signals at a plurality of instants to form a large number of samples. These sampled values are displayed on the cathode ray tube display 30 as shown in FIG. 2 and can also be stored in digital form for further analysis. The array shown is for 16 QAM and comprises 16 clusters 31, one for each modulation state or combination. Each sample comprises an I value and a Q value. The I values extend along the X axis and the Q values along the Y axis. Each point in a cluster corresponds to a sample.

This type of array can be used to analyse the digital radio transmission. If the transmission is functioning correctly then a regular non-distorted array will be generated. Faults in the transmission such as for example receiver carrier lock angle error or transmitter/receiver quadrature angle error manifest themselves as distortions in the constellation. The apparatus to be described can not only display the constellation but can also carry out measurements on the received digital radio transmissions to provide a quantitative indication of the magnitude of errors which occur in the transmission.

The device is illustrated as a block 34 in FIG. 1 and is coupled to the receiving equipment between the filters 23, 24 in the I and Q paths and the decision circuitry 25. When connected in this way the device receives the demodulated filtered I and Q channels. The device has various modes which enables the eye diagram for the I channel to be displayed, the eye diagram for the Q channel to be displayed, a constellation of the type shown in FIG. 2 to be displayed, and a measure mode in which measurements of the samples making up the constellation can be carried out. These measurements can be output either to the display 30 or to other external equipment. Details of the measurements will be given later. The device also has a print mode which outputs constellation data together with measurement results to an external printer. The mode can be selected by operation of the buttons shown in the region 35 of the panel in FIG. 2.

Figure 3A:
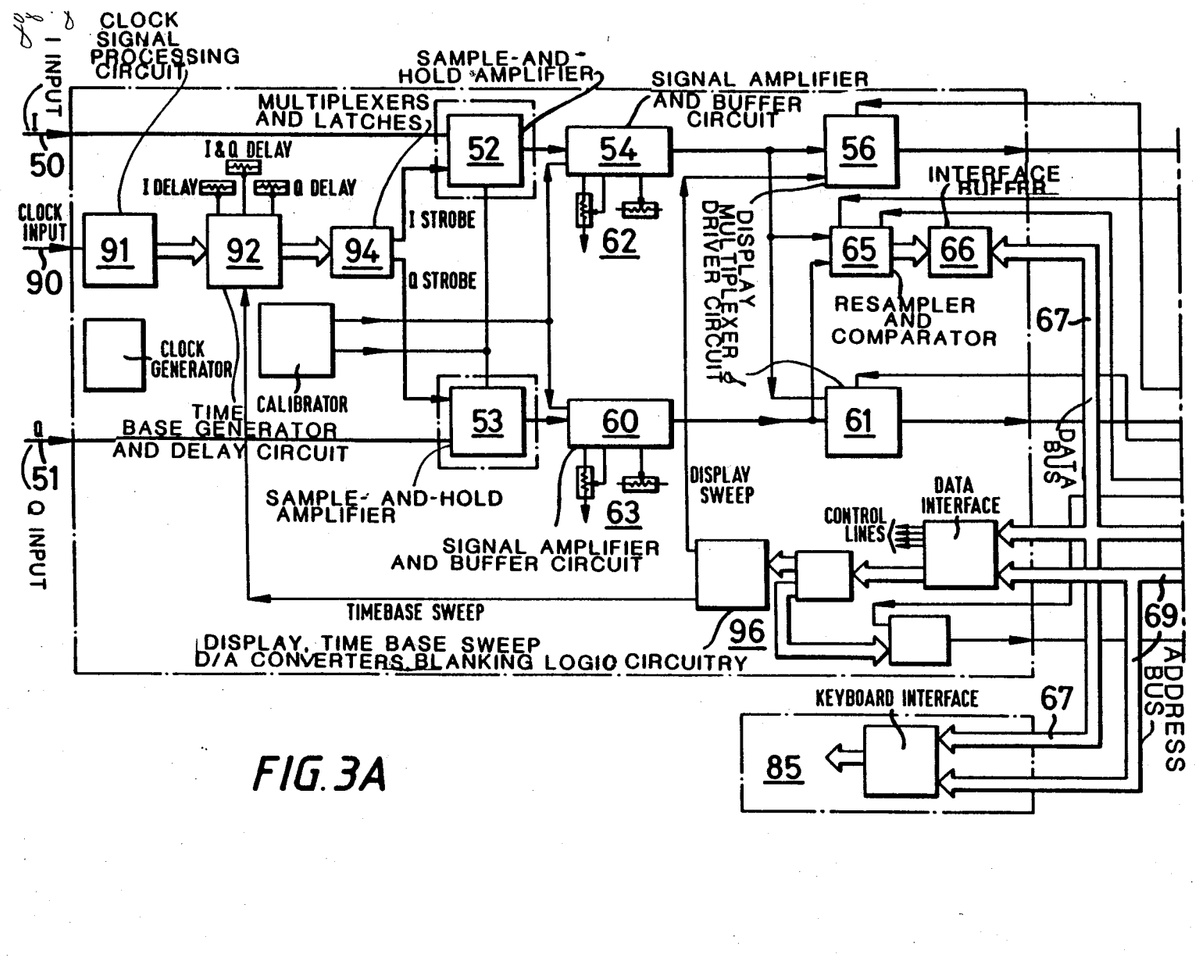
FIG. 3 is a block circuit diagram of a device in accordance with the present invention.
Figure 3B:
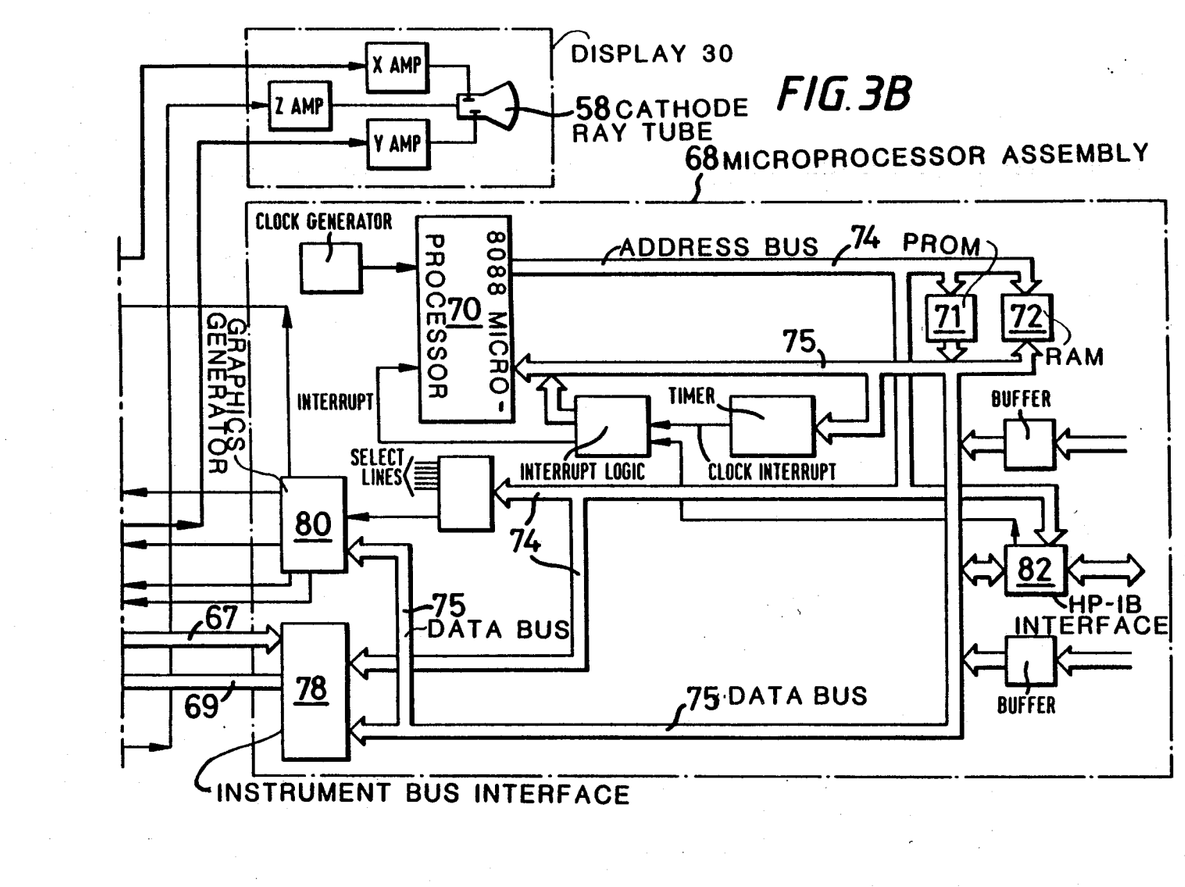

Referring now to FIG. 3 the I input to the device is shown at 50 and the Q input at 51. Each input 50, 51 is connected to a respective channel sample and hold amplifier 52, 53. The output of the amplifier 52 is connected by a signal amplifier and buffer circuit 54 to a display multiplexer and driver circuit 56. The circuit 56 is connected to the X deflection circuitry of a cathode ray tube 58. The amplifier 53 is connected by a signal amplifier and buffer circuit 60 to a display multiplexer and driver 61. The driver 61 is connected to the Y deflection circuitry of the cathode ray tube 58. Thus it will be seen that samples from the I channel are displayed along the X axis of the oscilloscope display whilst samples from the Q channel are displayed along the Y axis. Each circuit 54, 60 has associated therewith variable resistors 62, 63 which can be used to adjust the position and size of the displayed array. The resistors can be adjusted by means of knobs on the front panel of the device shown in FIG. 2. These knobs are shown in the area 36 on FIG. 2.

The output of each amplifier circuit 54, 60 is also connected to a re-sampler and comparator 65 which in turn is connected by an interface buffer 66 and data bus 67 to a microprocessor assembly 68. The microprocessor assembly has an 8088 device 70 with associated PROM 71 and RAM 72 with which it can communicate via address bus 74 and data bus 75. The data and address buses 74, 75 are also coupled to an instrument bus interface 78 which is connected to the data bus 67 and also to an address bus 69. The microprocessor assembly also includes a graphics generator 80 which has outputs to the circuits 56 and 61. An HP-IB interface 82 is also provided to allow interfacing with other equipment. Other blocks provide clock signals and timing signals for purposes which will be apparent to those skilled in the art.

The device also includes a keyboard assembly shown generally at 85. This comprises a keyboard interface which is coupled to the data bus 67 and address bus 69 and provides an interface between these buses and manually operable controls on, for example, the front panel of the device.

The timing signals for the sample and hold circuits 52, 53 are derived from clock signals applied to an input 90 from where they are fed to a clock signal processing circuit 91 which connects to a time base generator and delay circuit 92 and then to multiplexers and latches 94. The device also includes display and time base sweep D to A converters and blanking logic circuitry etc., which is shown schematically at 96.

In use the signals in the I and Q channels 50, 51 are sampled by circuits 52 and 53 at instants corresponding to the instants at which the decision circuitry of a digital radio receiver carries out its sampling operation. The sampling instants can be varied by means of manually operable controls coupled to the circuit 92. For each sample there is produced at the outputs of the circuits 54 and 60 an I level signal and a Q level signal. These signals can be fed via the circuits 56 and 61 to produce a display dot on the cathode ray tube 58 at a position corresponding to those I and Q levels. By producing several hundred or thousand samples it is possible to generate a display of the type shown in FIG. 2. This is a constellation display.

The signal levels of each sample can also be fed via the re-sampler 65 and digitised using the comparator which forms part of that circuit and a digital to analogue converter which forms part of the circuit 80 under the control of the microprocessor 70 in accordance with software stored in the memory 71. These operations comprise analogue to digital conversion. A preselected number of samples can be digitised and processed to obtain statistics data by the microprocessor 70 in accordance with software stored in the memory 71. The statistics can be stored in RAM 72 for subsequent further processing. The detail of the calculations which can be carried out by this software will be given below. The results of the calculations can be output for display on the cathode ray tube 58 and can also be output to a printer via for example the interface 82. The interface 82 also permits data from the memory 72 to be output for processing by an external processing device.

When the device is set up for a constellation display and measurement a graticule can be selected for display on the cathode ray tube. The operator is provided with a manual control which allows selection of a graticule which is appropriate to the modulation type of the radio transmission. The display of the graticule is controlled by the graphics generator 80. In the case of 16 QAM the graticule 32 comprises four equally spaced vertical and horizontal intersecting lines as shown in FIG. 2. The operator is also provided with means for adjusting the clusters of the constellation relative to the intersections of the graticule lines to set the constellation at the appropriate position for a measurement operation. This procedure is carried out manually by the operator using knobs on the front panel of the device. The knobs adjust the resistors 62, 63 of circuits 54 and 60 and allow the operator to shift the constellation horizontally or vertically or to expand and/or contract the clusters of the constellation to fit the grid arrangement of the graticule.

Figure 4A:
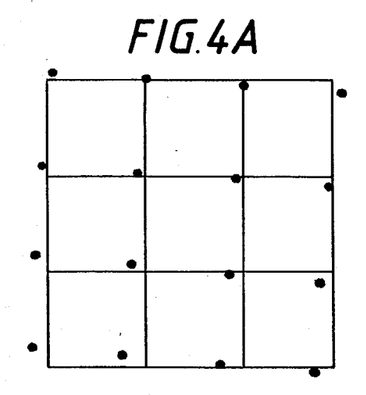
FIGS. 4A to 4C are examples of constellation displays.
Figure 4B:
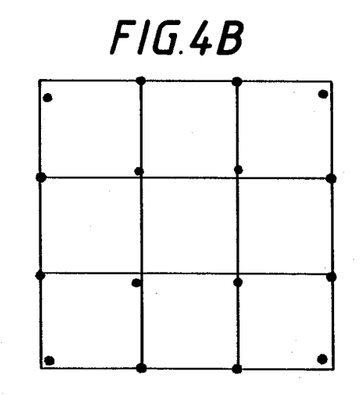
Figure 4C:
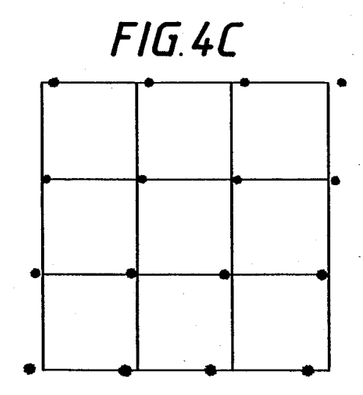

Examples of impairments which may be identified from a constellation display are:
Demodulator phase lock error (rotation)
Modulator/demodulator quadrature error (orthogonality error)
Interference from an unmodulated (CW) Source.
Amplitude compression/expansion (e.g. in power amplifier)
Amplitude to phase conversion (e.g. in power amplifier)
Faults or filter misadjustment in one baseband signal path Examples of constellations which can be produced are shown in FIG. 4. In FIG. 4A the constellation is rotated and this is indicative of a recovered carrier phase offset due to off frequency error or to recovery circuit fault. FIG. 4B shows a constellation which has been compressed. This can result from power amplifier fault. FIG. 4C shows an out of square array indicative of a modulator or demodulator fault. The displays shown in FIG. 4 indicate the types of faults which may be present in the radio transmission. They do not however provide accurate quantitative measurements. Accurate quantitative measurements can be obtained using the present device as will now be described.

Initially the device is set to its measurement mode by the operator and the graticule selected which is appropriate to the modulation scheme. The display 30 of the constellation is then adjusted so that the clusters of the constellation correspond closely with the intersections of the lines of the graticule. When the device is instructed to carry out a measurement operation it initially digitises and processes a large number of samples produced by the sampling circuits 52 and 53. The large number can be several hundred or a few thousand. In general a few thousand samples are sufficient to obtain a reliable result.

When the constellation is digitised the samples are selected at random from the continous stream of input samples. Two 10 bit analogue to digital conversions determine the I and Q signal levels of each sample and these digital values are stored in the memory 72 of the microprocessor assembly 68.

Referring to FIG. 2 the constellation display area is square and positioned slightly to the right of the cathode ray tube centre. Signal levels are measured in units scaled to the constellation display area. The centre of this display area which corresponds to the centre of the graticule is the zero point of the I and Q scales. The Q scale has a range of $-512$ to $+512$ from bottom to top of the display and similarly the I scale has a range of $-512$ to $+512$ from left to right going horizontally. Thus each constellation sample is a pair of numbers which will be in the range $-512$ to $+512$. Representing the samples as integers facilitates analysis of the constellation. In order to analyse a constellation it is necessary to divide the samples up depending on which constellation cluster they belong to. The easiest way to do this is to arrange for the operator to align the constellation relative to the display graticule as described and then compare the digitised samples to threshold values set midway between each pair of graticule lines. To achieve this the measurement scale is based on the position of each sample on the display rather than on the absolute input voltage of each sample.

Thus it will be seen that each digitised sample is allocated to a group whose boundary is defined by four numbers corresponding to the mid points of adjacent graticule lines or the measurement limit in each of the I and Q directions. In the case of 16 QAM there are 16 groups one for each cluster. The digitised samples are processed and stored as groups of statistics in the microprocessor assembly for subsequent further processing.

Figure 5:
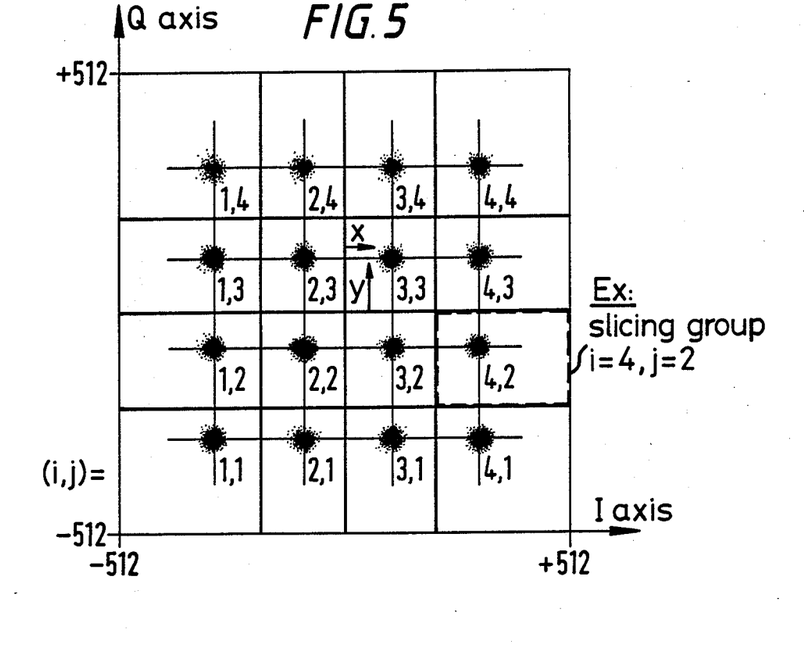
FIGS. 5 to 10 illustrate the operation of the present device.

As the samples are digitised the processing assembly carries out a first processing stage which will be understood by referring to FIG. 5. FIG. 5 illustrates a cluster comprising a plurality of dots, each dot representing a sample in the cluster. For each sample in the cluster there is an X value and a Y value expressed relative to a co-ordinate system centred on the centre of the display. The processor assembly calculates for each cluster:

The number of samples in a cluster
The sum of the X values of the samples
The sum of the Y values of the samples
The sum of $X^2$
The sum of $Y^2$
The sum of $X \times Y$ These statistics are accumulated in registers, there being a separate set of registers for each cluster in the constellation. These values represent the basic statistics data upon which the device operates to provide measurements of various constellation parameters. The values are accumulated in internal 16 bit and 32 bit registers. If too many samples are accumulated in any group one of these registers may overflow. When a new sample would cause overflow the device will report an error discard the sample and terminate the accumulation. The number of samples which can be accumulated before overflow depends upon the input signal and the modulation scheme. As a worst case, that is when all samples fall in one group at the extreme measurement limit of $+512$ or $-512$ which is extremely unlikely, the limit is reached at 8191 samples. However for a constellation with the samples distributed reasonably uniformly amongst the groups then of course the limit is much larger. In the case of 16 QAM with a reasonable constellation it is possible to accumulate on the order of 126000 samples before overflow occurs. As has been explained previously many digital radio impairments can be diagnosed by their effect on the constellation display. The present device allows these impairments to be analysed quantitatively and the following is an explanation of three of the quantitative measurements which can be made on constellation impairments.

The first of these is constellation closure which can be defined as the RMS size of the clusters divided by one half of the cluster spacing. The computation is based upon the statistics described above and stored in registers in the processor assembly. The computation can be compared to the $N-1$ weighted standard deviation of many pocket calculators. In order to obtain a single value for the entire constellation all the constellation clusters are combined together by subtracting the mean cluster position from the samples in each group. Then the standard deviation is computed using a weighting of $N-M^2$ where $M^2$ is the number of clusters ($(N-M^2)$ being the number of degrees of freedom). It will be appreciated that two numbers are obtained for constellation closure. One is for the I direction and one for the Q direction.

The second measurement relates to receiver carrier lock angle error which is overall rotation of the constellation. The error corresponds to the mean of two phase errors in the digital radio link. These are the orthogonality error between the transmitter I and receiver Q carriers and the orthogonality error between the transmitter Q and receiver I carriers. It is usually equal to the error in the receiver carrier recovery phase locked loop. Anti-clockwise rotation is taken as positive.

The third error is the transmitter/receiver quadrature angle error which is the name given to the difference from 90° of the angle between the I and Q cluster lines. This corresponds to the difference between two phase errors in the digital radio link. These are the orthogonality error between the transmitter I and receiver Q carriers and the orthogonility error between the transmitter Q and receiver I carriers. A positive error corresponds to an included angle greater than 90° at the lower left of the constellation.

Figure 6:
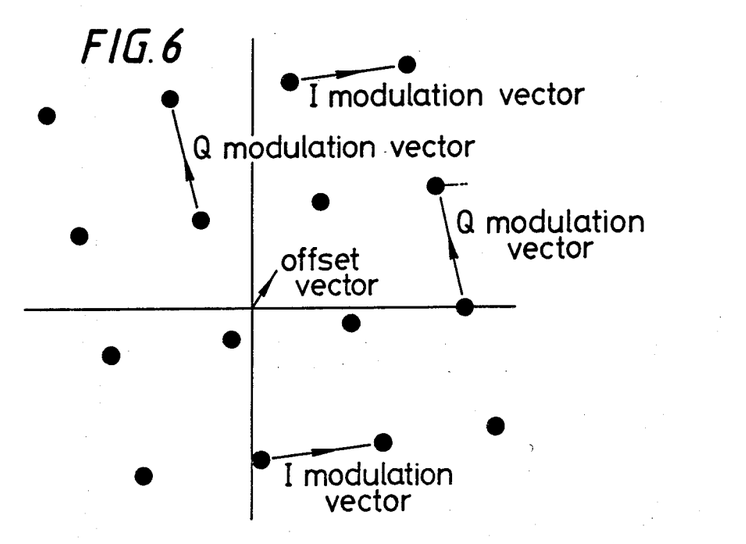
Figure 7:
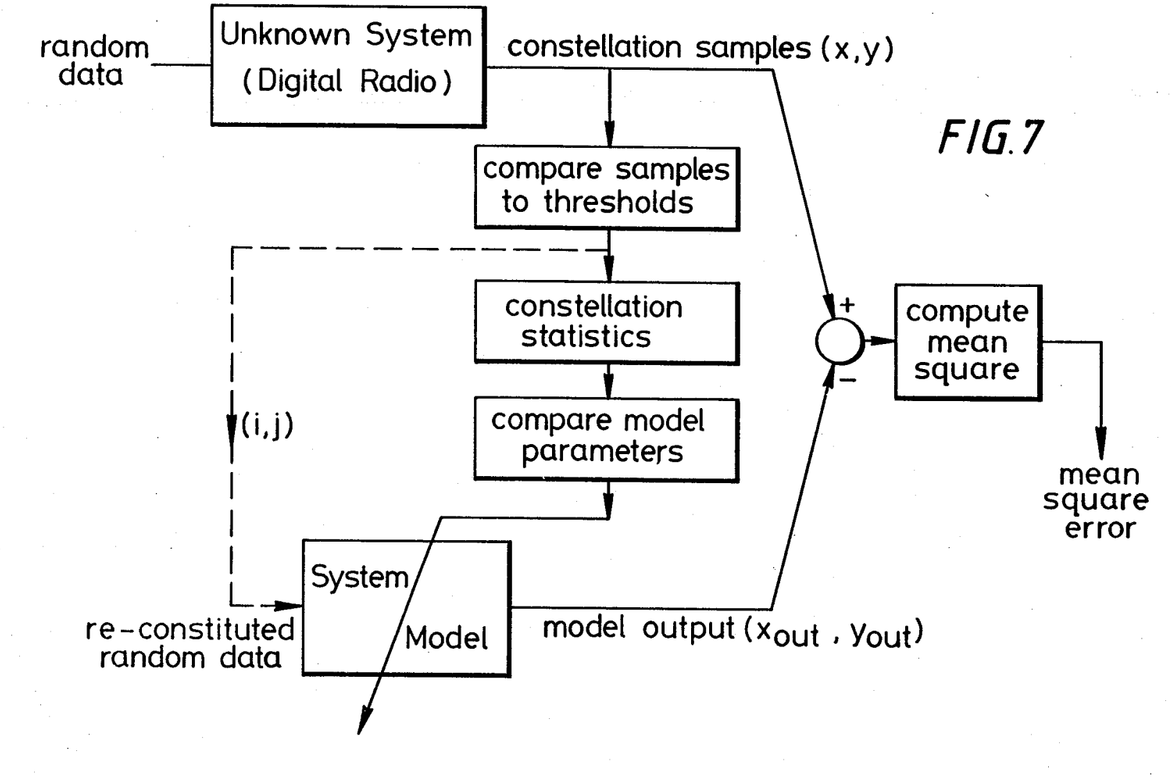

The lock angle error and quadrature angle error are determined using a least mean square error estimator technique. Again the computation is based upon the constellation statistics previously referred to and stored in the registers as described. The computation operates using the mean positions and number of samples of each of the clusters. The estimator essentially attempts to fit the mean cluster positions to a model constellation in which the clusters are perfect points, equally spaced in both I and Q directions with arbitrary amounts of overall rotation, parallelogram distortion and offset. This model constellation can be described by three vectors shown in FIG. 6. The mean squared error values for I and Q are defined as the mean over all samples of the square of the difference from the ideal constellation point. The computation determines directly the ideal constellation which minimises these error values. FIG. 7 illustrates schematically this concept. The calculation gives the parameters of a model which produces a simulated output which may be compared with the actual output, the parameters being computed so that the least mean square error is obtained. From this computation it is possible to obtain directly the lock error and quad error values. The mathematical expression of these concepts will be given below.

If the clusters do not lie on parallel lines so that there appear to be four slightly different values for the angle between the cluster lines and the graticule lines this is not essentially a problem. The ideal constellation always has its points on parallel lines so there is only one possible value of lock and quad error. The computation provides a best fit least mean square ideal constellation which gets as close as possible to the measured constellation.

Mathematically the model can be considered as follows:

The values i and j identify the particular transmitter I and Q modulation states associated with each constellation cluster (or sample group). X OUT and Y OUT are calculated or predicted values which are compared with the actual sample values X and Y. X OUT and Y OUT can be expressed as follows:

X OUT = spacing$_I(i-d)$ + cross-modulation$_I(j-d)$ + position$_I$

Y OUT = spacing$_Q(j-d)$ + cross-modulation$_Q(i-d)$ + position$_Q$

Spacing, cross-modulation and position are coefficients which are calculated such that the RMS error between predicted X OUT and Y OUT and measured X OUT and Y OUT is a minimum. In practice the computation is a matrix calculation expressed as follows:

FOR I $$A^{-1} B_I = \begin{bmatrix} \text{Spacing } I \\ \text{Cross-modulation } I \\ \text{Position } I \end{bmatrix}$$

$$A = \sum_{i=1}^{M} \sum_{j=1}^{M} \text{number of samples}(i,j) \begin{bmatrix} (i-d)^2 & (i-d)(j-d) & (i-d) \\ (i-d)(j-d) & (j-d)^2 & (j-d) \\ (i-d) & (j-d) & 1 \end{bmatrix}$$

$$B_I = \sum_{i=1}^{M} \sum_{j=1}^{M} \text{sum of } x \text{ values } (i,j) \begin{bmatrix} (i-d) \\ (j-d) \\ 1 \end{bmatrix}$$

FOR Q $$A^{-1} B_Q = \begin{bmatrix} \text{Cross-modulation } Q \\ \text{Spacing } Q \\ \text{Position } Q \end{bmatrix}$$

$$B_Q = \sum_{i=1}^{M} \sum_{j=1}^{M} \text{sum of } y \text{ values } (i,j) \begin{bmatrix} (i-d) \\ (j-d) \\ 1 \end{bmatrix}$$

These evaluations are carried out for all clusters and the result is values for the coefficients spacing, cross modulation and position. The final step is the calculation of closure, lock angle and quad angle as follows:

$$I \text{ CLOSURE} = \frac{I \text{ cluster size}}{I \text{ spacing}} * 2 * 100\%$$

$$Q \text{ CLOSURE} = \frac{Q \text{ cluster size}}{Q \text{ spacing}} * 2 * 100\%$$

$$\text{Lock angle} = \tfrac{1}{2} \left[ \tan^{-1} \frac{(Q \text{ cross-modulation})}{Q \text{ spacing}} - \tan^{-1} \frac{(I \text{ cross-modulation})}{I \text{ spacing}} \right]$$

$$\text{Quad angle} = -\tan^{-1} \frac{(Q \text{ cross-modulation})}{Q \text{ spacing}} - \tan^{-1} \frac{(I \text{ cross-modulation})}{I \text{ spacing}}$$

These values when evaluated can be displayed alongside the constellation as shown in FIG. 2. The mathematics explained above is summarised in Appendix A.

The examples given above relate to the measurement of linear effects. It is also possible to use the device to measure non-linear effects. Non-linear effects can arise from the M-level signals at the modulator, from the predistorter and from the travelling wave tube.

We have identified residual non-linearities which can be defined by new measurements. These measurements are independent of all linear impairments such as quadrature error and lock error. Three of these measurements are total residual non-linearity, radial residual non-linearity and angular non-linearity. They are termed residual because they represent what is left after a least means square error criterion has been used to remove all linear effects. They are important because the automatic level control circuits of a radio tend to compensate for compression and the carrier recovery loop tends to compensate for am/pm, any resultant effect being a residual non-linear displacement of the clusters.

Figure 8:
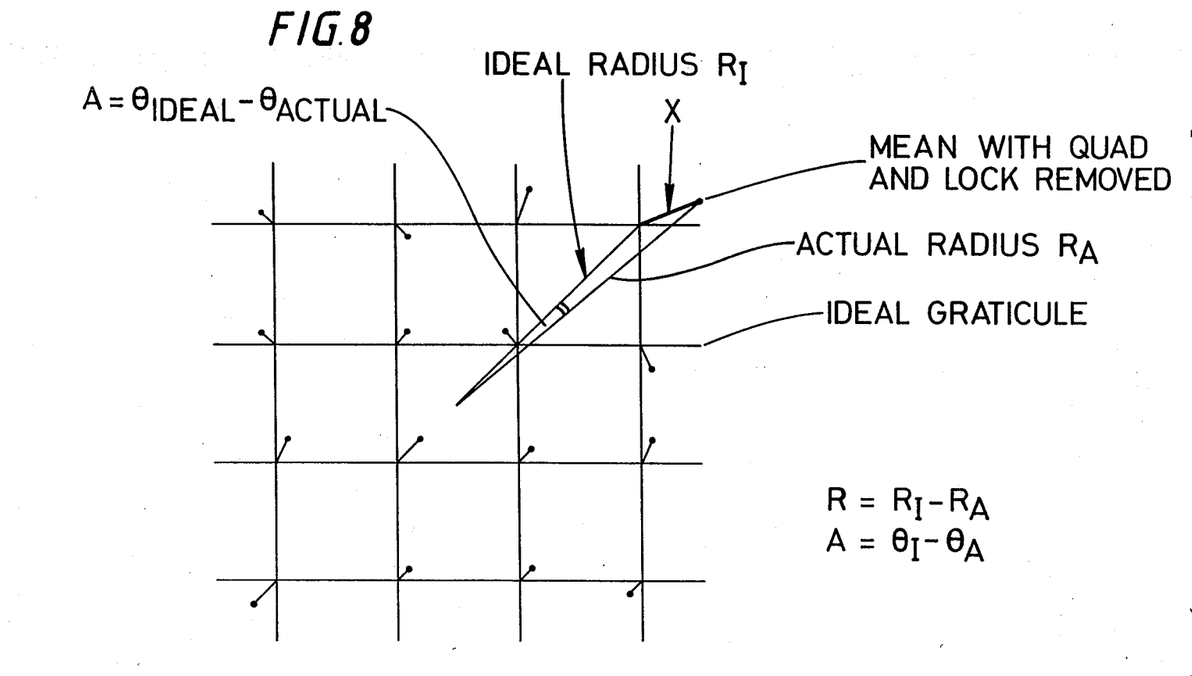

The parameters referred to can be evaluated as follows:
(i) Form means and vacancies for each cluster
(ii) Estimate the state spacing, offset and cross modulation coefficients
(iii) Form a modifier matrix from the parameters in (ii) above
(iv) Transform the means in (i) using the modifier matrix to remove the effects of all linear impairments The resulting information is shown in FIG. 8. Then $$\text{Total Residual Non-Linearity} = \sqrt{\frac{\Sigma X \cdot X}{\text{Number of States}}}$$

$$\text{Radial Residual Non-Linearity} = \sqrt{\frac{\Sigma R \cdot R}{\text{Number of States}}}$$

$$\text{Angular Residual Non-Linearity} = \sqrt{\frac{\Sigma A \cdot A}{\text{Number of States}}}$$

where
$X$ = Vector Separation
$R$ = Radial Error
$A$ = Angular Error

It will be appreciated that these parameters can be evaluated using the statistics accumulated in the registers of the processing assembly. They can be output on to the display or to a printer.

A further set of three non-linear measurements which can be made are amplitude compression, amplitude to phase conversion, and worst decision margin reduction. These all make use of the least mean squared error model already described.

Figure 9:
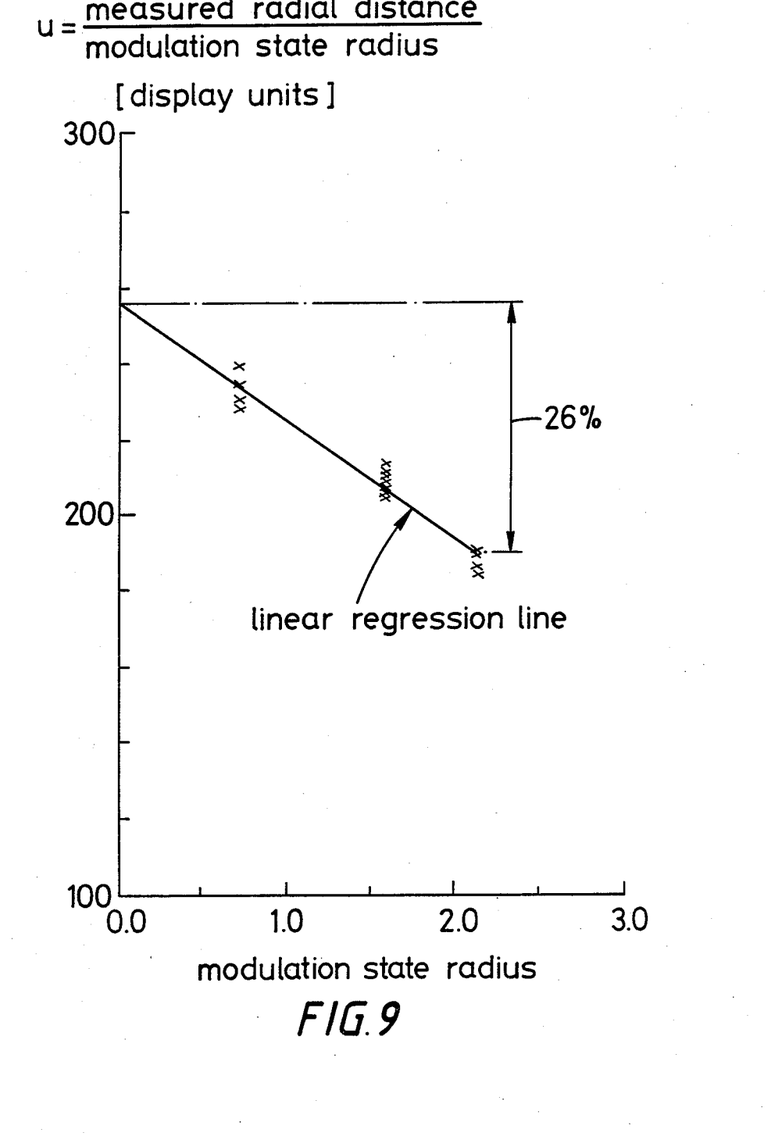

Amplitude compression measures the radial displacement of the clusters at the four corners of the constellation as a fraction of the radial distance from the constellation centre. This is obtained using linear regression of the measured radial distance factor $u(i,j)$ upon the modulation state radial distance $s(i,j)$ (see FIG. 9).

Figure 10:
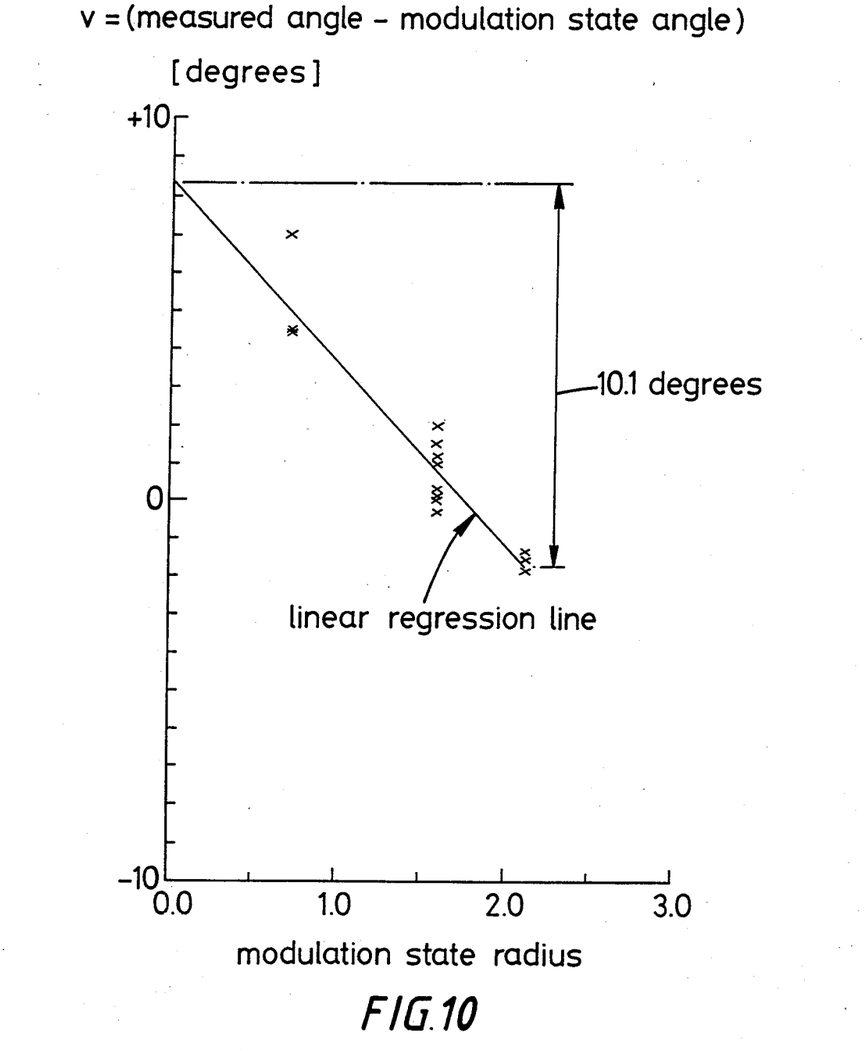

Amplitude to phase conversion measures the angular displacement of the clusters at the four corners of the constellation. This is obtained using linear regression of the measured angular displacement error $v(i,j)$ upon the modulation state radial distance $s(i,j)$ (see FIG. 10).

Worst decision margin reduction is defined as the worst displacement of the mean position of any of the clusters from the model position, divided by one half of the overall cluster spacing. Two values are computed for I and Q and the larger is the worst decision margin reduction.

These measurements are computed using values from the least mean square error model, and additional values as described below.

For each cluster, the following are evaluated:

$$I \text{ modulation } (i,j) = \frac{\text{sum of } x \text{ values } (i,j)}{\text{number of samples } (i,j)} - \text{position } I$$

$$I \text{ displacement } (i,j) = I \text{ modulation } (i,j) - (\text{spacing } I)(i - d)$$

$$Q \text{ modulation } (i,j) = \frac{\text{sum of } y \text{ values } (i,j)}{\text{number of samples } (i,j)} - \text{position } Q$$

$$Q \text{ displacement } (i,j) = Q \text{ modulation } (i,j) - (\text{spacing } Q)(j - d)$$

$$s(i,j) = ((i - d)^2 + (j - d)^2)^{\frac{1}{2}}$$

$$u(i,j) = \frac{((I \text{ modulation } (i,j))^2 + (Q \text{ modulation } (i,j))^2)^{\frac{1}{2}}}{s(i,j)}$$

$$v(i,j) = \tan^{-1}\left(\frac{Q \text{ modulation } (i,j)}{I \text{ modulation } (i,j)}\right) - \tan^{-1}\left(\frac{j - d}{i - d}\right)$$

Then the following summations are evaluated over all clusters for which $(i - d)$ or $(j - d)$ are not both zero.

$$\text{count} = \sum_{i=1}^{m} \sum_{j=1}^{m} w(i,j)$$

$$\text{sum\_s} = \sum_{i=1}^{m} \sum_{j=1}^{m} w(i,j) \, s(i,j)$$

$$\text{sum\_ss} \sum_{i=1}^{m} \sum_{j=1}^{m} w(i,j) \, s(i,j) \, s(i,j)$$

$$\text{sum\_u} = \sum_{i=1}^{m} \sum_{j=1}^{m} w(i,j) \, u(i,j)$$

$$\text{sum\_su} = \sum_{i=1}^{m} \sum_{j=1}^{m} w(i,j) \, s(i,j) \, u(i,j)$$

$$\text{sum\_v} = \sum_{i=1}^{m} \sum_{j=1}^{m} w(i,j) \, v(i,j)$$

$$\text{sum\_sv} = \sum_{i=1}^{m} \sum_{j=1}^{m} w(i,j) \, s(i,j) \, v(i,j)$$

There are two alternative choices for the weighting factors $w(i,j)$.

$$w(i,j) = 1 \qquad\qquad 1.$$

$$w(i,j) = \frac{\text{number of samples } (i,j) - 1}{((\text{sum of } x^2) - (\text{sum of } x)^2/(\text{number of samples}))} \quad 2.$$

The choice affects the speed of computation and the precision of the results.

Finally the measurements are computed.

worst decision margin reduction $I$ (WDMR $I$) =

$$\frac{\text{maximum } I \text{ displacement } (i,j)}{\text{spacing } I} * 2 * 100\%$$

worst decision margin reduction $Q$ (WDMR $Q$) =

$$\frac{\text{maximum } Q \text{ displacement } (i,j)}{\text{spacing } Q} * 2 * 100\%$$

worst decision margin reduction =

$$\text{maximum } (WDMR\ I,\ WDMR\ Q)$$

$$\text{am intercept} = \frac{\text{sum\_u sum\_ss} - \text{sum\_su sum\_s}}{\text{count sum\_ss} - (\text{sum\_s})^2}$$

$$\text{am slope} = \frac{\text{count sum\_su} - \text{sum\_u sum\_s}}{\text{count sum\_ss} - (\text{sum\_s})^2}$$

$$\text{pm intercept} = \frac{\text{sum\_v sum\_ss} - \text{sum\_sv sum\_s}}{\text{count sum\_ss} - (\text{sum\_s})^2}$$

-continued $$\text{pm slope} = \frac{\text{count sum\_sv} - \text{sum\_v sum\_s}}{\text{count sum\_ss} - (\text{sum\_s})^2}$$

$$\text{amplitude compression} = \frac{\text{am slope} * (d-1) * \text{sqrt}(2)}{\text{am intercept}} * 100\%$$

$$\text{amplitude to phase conversion} = \text{pm slope} * (d-1) * \text{sqrt}(2)$$

The above description relates to a device for analysing 16 QAM transmissions. It will be appreciated that it can also be used to analyse many other types of modulation schemes such as QPSK, 4 QAM, 9 PRS, 49 PRS, 7 LPR, 64 QAM, 128 QAM, 256 QAM and 512 QAM.

APPENDIX

Measurement samples $\quad (x_r, y_r) \; r = 1 \text{ to } N$

↓ Samples sliced into buckets $(x_{ihk}, y_{ijk}) \quad i = 1 \text{ to } m$
$\phantom{(x_{ihk}, y_{ijk}) \quad} j = 1 \text{ to } m$
$\phantom{(x_{ihk}, y_{ijk}) \quad} k = 1 \text{ to } n_{ij}$ ↓ Statistics accumulated Constellation statistics $\quad$ sum-count $(i,j) = n_{ij}$ $$\text{sum-x} = \sum_{k=1}^{n_{ij}} x_{ijk}$$

$$\text{sum-y}(i,j) = \sum_{k=1}^{n_{ij}} y_{ijk} \quad \begin{matrix} i = 1 \text{ to } m \\ j = 1 \text{ to } m \end{matrix}$$

$$\text{sum-xx}(i,j) = \sum_{k=1}^{n_{ij}} x_{ijk}^2$$

$$\text{sum-yy}(i,j) = \sum_{k=1}^{n_{ij}} y_{ijk}^2$$

$$\text{sum-xy}(i,j) = \sum_{k=1}^{n_{ij}} x_{ijk} y_{ijk}$$

↓ Intermediate calculation $$I \text{ clustor size} = \sqrt{\frac{1}{N-m^2} \left[ \sum_{i=1}^{m} \sum_{j=1}^{m} \text{sum\_xx}(i,j) - \frac{[\text{sum-x}(i,j)]^2}{\text{sum-count}(i,j)} \right]}$$

$$Q \text{ cluster size} = \sqrt{\frac{1}{N-m^2} \left[ \sum_{i=1}^{m} \sum_{j=1}^{m} \text{sum-yy}(i,j) - \frac{[\text{sum-y}(i,j)]^2}{\text{sum count}(i,j)} \right]}$$

$$\text{matrix } A = \sum_{i=1}^{m} \sum_{j=1}^{m} \text{sum-count}(i,j) \begin{bmatrix} (i-d)^2 & (i-d)(j-d) & (i-d) \\ (i-d)(j-d) & (j-d)^2 & (j-d) \\ (i-d) & (j-d) & 1 \end{bmatrix}^F$$

$$\text{Matrix } B_I = \sum_{i=1}^{m} \sum_{j=1}^{m} \text{sum-x}(i,j) \begin{bmatrix} (i-d) \\ (j-d) \\ 1 \end{bmatrix}^F$$

$$\text{matrix } B_Q = \sum_{i=1}^{m} \sum_{j=1}^{m} \text{sum-y}(i,j) \begin{bmatrix} (i-d) \\ (j-d) \\ 1 \end{bmatrix}^F$$

-continued

Solution of matrix equations $$\text{Matrix } T_I = \begin{bmatrix} \text{spacing } I \\ \text{cross-modulation } I \\ \text{position } I \end{bmatrix} = A^{-1} B_I *$$

$$\text{Matrix } T_Q = \begin{bmatrix} \text{cross-modulation } Q \\ \text{spacing } Q \\ \text{Postion } Q \end{bmatrix} = A^{-1} B_Q *$$

computation of final results

Constellation analysis results $$I \text{ constellation closure} = 2 \frac{I \text{ closure size}}{I \text{ spacing}}$$

$$Q \text{ constellation closure} = 2 \frac{Q \text{ cluster size}}{Q \text{ spacing}}$$

$$\text{Lock angle} = \tfrac{1}{2} \left[ \tan^{-1}\left( \frac{Q \text{ cross mod.}}{Q \text{ spacing}} \right) + -\tan^{-1}\left( \frac{I \text{ cross mod.}}{I \text{ spacing}} \right) \right]$$

$$\text{quad angle} = -\tan^{-1}\left( \frac{Q \text{ cross mod.}}{2 \text{ spacing}} \right) + -\tan^{-1}\left( \frac{I \text{ cross mod.}}{I \text{ spacing}} \right)$$

General Notation $X_r$ I components of sample No r
$Y_r$ Q component of sample no r
$n_{ij}$ The number of samples which, after slicing, fell within the boundaries of bucket (i,j)
N The total number of samples in the constellation measurement.
m Number of modulator levels in the modulation scheme. e.g. 4 for 16 QAM.
d $$\frac{m+1}{2}$$

$x_{ijk}$ I component of sample no k in group (i,j)
$Y_{ijk}$ Q component of sample no k in group (i,j)

NOTES

* Matrix A is positive definite (assuming any three slicing buckets, not in a straight line, are nonempty) therefore the matrix equation always has a solution.
+ The equations for lock and quad angle are arranged to compensate for any difference between I and Q spacing. The assumption is that the I and Q channels have equal modulation level spacing.
∓ The use of (i−d) and (j−d) reduces the dynamic range, making implementation simpler and more efficient.
* The equations are solved using L-U decomposition as this improves computational efficiency.

What is claimed is:

1. An apparatus for analyzing digital radio transmissions comprising:
sampling means for sampling received radio signals to produce for each sampling instant a signal or signals as samples which are representative of the modulation state of the transmission at the sampling instant, and processing means which is configured to receive and measure a given number of said signals, wherein said processing means is configured to process said signals in accordance with one or more stored routines to generate one or more parameters which are indicative of the condition of the transmission, wherein said samples are represented by digitally encoded numbers and said processing means is arranged to allocate said numbers to one of a plurality of groups, the number of groups corresponding to the number of modulation states of the transmission, and wherein said processing means is further configured to carry out a plurality of processing stages, a first processing stage comprising the evaluation of a set of statistics which comprise data representative of the position of each sample in a co-ordinate system, and a second stage of which comprises forming, using a least mean square error technique, a model cluster array which is a closest fit to the array represented by said statistics, said modelling stage producing a set of coefficients from which is calculated parameters representing distortions of a constellation, and wherein said processing means is further configured to evaluate a radial residual non-linearity parameter and an angular residual non-linearity parameter, said parameters being evaluated by removing linear effects using a least mean squares error technique.

2. An apparatus for analyzing digital radio transmissions comprising:
sampling means for sampling received radio signals to produce for each sampling instant a signal or signals as samples which are representative of the modulation state of the transmission at the sampling instant, and processing means which is configured to receive and measure a given number of said signals, wherein said processing means is configured to process said signals in accordance with one or more stored routines to generate one or more parameters which are indicative of the condition of the transmission, wherein said samples are represented by digitally encoded numbers and said processing means is arranged to allocate said numbers to one of a plurality of groups, the number of groups corresponding to the number of modulation states of the transmission, display means for displaying said parameters, and wherein said processing means is further configured to process said parameters for display of both diagrammatic and numerical quantitative information simultaneously on said display, wherein said information is indicative of the condition of the transmission, and wherein said processing means is arranged to evaluate the root mean square size of each group of samples to thereby provide a quantitative measurement of radio communication impairment, and wherein said processing means is arranged to evaluate a radial residual non-linearity parameter and an angular residual non-linearity parameter, said parameters being evaluated by removing linear effects using a least mean squares error technique.

3. An apparatus for analyzing digital radio transmissions comprising:

sampling means for sampling received radio signals to produce for each sampling instant a signal or signals as samples which are representative of the modulation state of the transmission at the sampling instant, and processing means which is configured to receive and measure a given number of said signals, wherein said processing means is configured to process said signals in accordance with one or more stored routines to generate one or more parameters which are indicative of the condition of the transmission, wherein said samples are represented by digitally encoded numbers and said processing means is arranged to allocate said numbers to one of a plurality of groups, the number of groups corresponding to the number of modulation states of the transmission, display means for displaying said parameters, and wherein said processing means is further configured to process said parameters for display of both diagrammatic and numerical quantitative information simultaneously on said display, wherein said information is indicative of the condition of the transmission, and wherein the processing means is arranged to carry out a plurality of processing stages, a first processing stage comprising the evaluation of a set of statistics which comprise data representative of the position of each sample in a co-ordinate system, and a second stage of which comprises forming, using a least mean square error technique, a model cluster array which is a closest fit to the array represented by said statistics, said modelling stage producing a set of coefficients from which is calculated parameters representing a measurement of radio communication impairment, and wherein said processing means is arranged to evaluate a radial residual non-linearity parameter and an angular residual non-linearity parameter, said parameters being evaluated by removing linear effects using a least mean squares error technique.

4. An apparatus for analyzing digital radio transmissions comprising:

sampling means for sampling received radio signals to produce for each sampling instant a signal or signals as samples which are representative of the modulation state of the transmission at the sampling instant, processing means which is configured to receive and measure a given number of said signals, wherein said processing means is configured to process said signals in accordance with one or more stored routines to generate one or more parameters which are indicative of the condition of the transmission, wherein said samples are represented by digitally encoded numbers and said processing means is arranged to allocate said numbers to one of a plurality of groups, the number of groups corresponding to the number of modulation states of the transmission, and wherein said processing means is further configured to evaluate the root mean square size of each group of samples to thereby provide a quantitative measurement of radio communication impairment, and wherein said processing means is arranged to evaluate a radial residual non-linearity parameter and an angular residual non-linearity parameter, said parameters being evaluated by removing linear effects using a least mean squares error technique.

* * * * *